United States Patent
Meirav et al.

(10) Patent No.: US 9,533,250 B2
(45) Date of Patent: Jan. 3, 2017

(54) SORBENTS FOR CARBON DIOXIDE REDUCTION FROM INDOOR AIR

(75) Inventors: Udi Meirav, Newton, MA (US); Israel Biran, Avihayil (IL)

(73) Assignee: Enverid Systems, Inc., Needham, MA (US)

( * ) Notice: Subject to any disclaimer, the term of this patent is extended or adjusted under 35 U.S.C. 154(b) by 0 days.

(21) Appl. No.: 14/117,797

(22) PCT Filed: May 17, 2012

(86) PCT No.: PCT/US2012/038343
§ 371 (c)(1),
(2), (4) Date: Jun. 20, 2014

(87) PCT Pub. No.: WO2012/158911
PCT Pub. Date: Nov. 22, 2012

(65) Prior Publication Data
US 2014/0298996 A1    Oct. 9, 2014

Related U.S. Application Data (60) Provisional application No. 61/575,577, filed on Aug. 23, 2011.

(51) Int. Cl.
*B01D 53/02* (2006.01)
*B01D 53/04* (2006.01)
(Continued)

(52) U.S. Cl.
CPC ............. *B01D 53/04* (2013.01); *B01D 53/025* (2013.01); *B01J 20/12* (2013.01); *B01J 20/3204* (2013.01);
(Continued)

(58) Field of Classification Search
CPC ............ B01D 2252/204; B01D 2253/11; B01D 2253/25; B01D 2257/504; B01D 2259/40086; B01D 2259/4508; B01D 2259/4575; B01D 53/025; B01D 53/04; B01J 20/12; B01J 20/3204; B01J 20/3248; B01J 20/3272; Y02C 10/04; Y02C 10/08
See application file for complete search history.

(56) References Cited

U.S. PATENT DOCUMENTS 1,522,480 A    1/1925   Allen
1,836,301 A   12/1931   Bechtold
(Continued)

FOREIGN PATENT DOCUMENTS

CA    2640152 A1    4/2010
CN    2141873 Y     9/1993
(Continued)

OTHER PUBLICATIONS

International Search Report of PCT/US2012/038343, issued Jan. 28, 2013.
(Continued)

*Primary Examiner* — Christopher P Jones
(74) *Attorney, Agent, or Firm* — Cooley LLP (57) ABSTRACT

A sorbent for $CO_2$ reduction from indoor air from an enclosed space. In some embodiments, the sorbent comprises a solid support and an amine-based compound being supported by the support. The sorbent captures at least a portion of the $CO_2$ within the indoor air. The sorbent may be regenerated by streaming outdoor air through the sorbent to release at least a portion of the captured $CO_2$. The sorbent is structured to allow indoor air to flow therein with relatively low flow resistance and relatively rapid reaction kinetics. Regeneration may be performed at relatively low outdoor air temperatures, thereby minimizing the thermal energy required for regenerating the sorbent.

26 Claims, 6 Drawing Sheets

(51) Int. Cl.
*B01J 20/12* (2006.01)
*B01J 20/32* (2006.01)

(52) U.S. Cl.
CPC ......... *B01J 20/3248* (2013.01); *B01J 20/3272* (2013.01); *B01D 2252/204* (2013.01); *B01D 2253/11* (2013.01); *B01D 2253/25* (2013.01); *B01D 2257/504* (2013.01); *B01D 2259/40086* (2013.01); *B01D 2259/4508* (2013.01); *B01D 2259/4575* (2013.01); *Y02C 10/04* (2013.01); *Y02C 10/08* (2013.01)

(56) References Cited

U.S. PATENT DOCUMENTS

| | | | |
|---|---|---|---|
| 3,107,641 | A | 10/1963 | Haynes |
| 3,511,595 | A | 5/1970 | Fuchs |
| 3,619,130 | A | 11/1971 | Ventriglio et al. |
| 3,702,049 | A | 11/1972 | Morris, Jr. |
| 3,751,848 | A | 8/1973 | Ahlstrand |
| 3,808,773 | A | 5/1974 | Reyhing et al. |
| 3,885,928 | A | 5/1975 | Wu |
| 4,182,743 | A | 1/1980 | Rainer et al. |
| 4,228,197 | A | 10/1980 | Means |
| 4,249,915 | A | 2/1981 | Sircar et al. |
| 4,292,059 | A | 9/1981 | Kovach |
| 4,322,394 | A | 3/1982 | Mezey et al. |
| 4,325,921 | A | 4/1982 | Aiken et al. |
| 4,433,981 | A | 2/1984 | Slaugh et al. |
| 4,451,435 | A | 5/1984 | Holter et al. |
| 4,530,817 | A | 7/1985 | Hölter et al. |
| 4,551,304 | A | 11/1985 | Holter et al. |
| 4,559,066 | A | 12/1985 | Hunter et al. |
| 4,711,645 | A | 12/1987 | Kumar |
| 4,810,266 | A | 3/1989 | Zinnen et al. |
| 4,892,719 | A | 1/1990 | Gesser |
| 4,917,862 | A | 4/1990 | Kraw et al. |
| 4,987,952 | A | 1/1991 | Beal et al. |
| 5,046,319 | A | 9/1991 | Jones |
| 5,087,597 | A | 2/1992 | Leal et al. |
| 5,137,548 | A | 8/1992 | Grenier et al. |
| 5,186,903 | A | 2/1993 | Cornwell |
| 5,221,520 | A | 6/1993 | Cornwell |
| 5,231,063 | A | 7/1993 | Fukumoto et al. |
| 5,281,254 | A | 1/1994 | Birbara et al. |
| 5,290,345 | A | 3/1994 | Osendorf et al. |
| 5,292,280 | A | 3/1994 | Janu et al. |
| 5,322,473 | A | 6/1994 | Hofstra et al. |
| 5,352,274 | A | 10/1994 | Blakley |
| 5,376,614 | A | 12/1994 | Birbara et al. |
| 5,389,120 | A | 2/1995 | Sewell et al. |
| 5,464,369 | A | 11/1995 | Federspiel |
| 5,492,683 | A | 2/1996 | Birbara et al. |
| 5,584,916 | A | 12/1996 | Yamashita et al. |
| 5,675,979 | A | 10/1997 | Shah |
| 5,707,005 | A | 1/1998 | Kettler et al. |
| 5,827,355 | A | 10/1998 | Wilson et al. |
| 5,869,323 | A | 2/1999 | Horn |
| 5,876,488 | A | 3/1999 | Birbara et al. |
| 5,948,355 | A | 9/1999 | Fujishima et al. |
| 5,964,927 | A | 10/1999 | Graham et al. |
| 5,984,198 | A | 11/1999 | Bennett et al. |
| 6,027,550 | A | 2/2000 | Vickery |
| 6,102,793 | A | 8/2000 | Hansen |
| 6,113,674 | A | 9/2000 | Graham et al. |
| 6,123,617 | A | 9/2000 | Johnson |
| 6,187,596 | B1 | 2/2001 | Dallas et al. |
| 6,280,691 | B1 | 8/2001 | Homeyer et al. |
| 6,364,938 | B1 | 4/2002 | Birbara et al. |
| 6,432,367 | B1 | 8/2002 | Munk |
| 6,533,847 | B2 | 3/2003 | Seguin et al. |
| 6,547,854 | B1 | 4/2003 | Gray et al. |
| 6,605,132 | B2 | 8/2003 | Fielding |
| 6,623,550 | B2 | 9/2003 | Shah et al. |
| 6,711,470 | B1 | 3/2004 | Hartenstein et al. |
| 6,726,558 | B1 | 4/2004 | Meirav |
| 6,773,477 | B2 | 8/2004 | Lindsay |
| 6,796,896 | B2 | 9/2004 | Laiti |
| 6,797,246 | B2 | 9/2004 | Hopkins |
| 6,866,701 | B2 | 3/2005 | Meirav |
| 6,908,497 | B1 | 6/2005 | Sirwardane |
| 6,916,239 | B2 | 7/2005 | Siddaramanna et al. |
| 6,916,360 | B2 | 7/2005 | Seguin et al. |
| 6,930,193 | B2 | 8/2005 | Yaghi et al. |
| 6,974,496 | B2 | 12/2005 | Wegeng et al. |
| 7,288,136 | B1 | 10/2007 | Gray et al. |
| 7,407,533 | B2 | 8/2008 | Steins |
| 7,407,633 | B2 | 8/2008 | Potember et al. |
| 7,449,053 | B2 | 11/2008 | Hallam |
| 7,472,554 | B2 | 1/2009 | Vosburgh |
| 7,645,323 | B2 | 1/2010 | Massenbauer-Strafe et al. |
| 7,662,746 | B2 | 2/2010 | Yaghi et al. |
| 7,666,077 | B1 | 2/2010 | Thelen |
| 7,802,443 | B2 | 9/2010 | Wetzel |
| 7,891,573 | B2 | 2/2011 | Finkam et al. |
| 8,157,892 | B2 | 4/2012 | Meirav |
| 8,317,890 | B2 | 11/2012 | Raether et al. |
| 8,491,710 | B2 | 7/2013 | Meirav |
| 8,690,999 | B2 | 4/2014 | Meirav et al. |
| 2001/0021363 | A1 | 9/2001 | Poles et al. |
| 2002/0056373 | A1 | 5/2002 | Fielding |
| 2002/0078828 | A1 | 6/2002 | Kishkovich et al. |
| 2002/0083833 | A1 | 7/2002 | Nalette et al. |
| 2002/0147109 | A1 | 10/2002 | Branover et al. |
| 2002/0183201 | A1 | 12/2002 | Barnwell et al. |
| 2002/0193064 | A1 | 12/2002 | Michalakos et al. |
| 2003/0097086 | A1 | 5/2003 | Gura |
| 2003/0188745 | A1 | 10/2003 | Deas et al. |
| 2004/0005252 | A1 | 1/2004 | Siess |
| 2004/0069144 | A1 | 4/2004 | Wegeng et al. |
| 2004/0118287 | A1 | 6/2004 | Jaffe et al. |
| 2005/0191219 | A1 | 9/2005 | Uslenghi et al. |
| 2005/0262869 | A1 | 12/2005 | Tongu et al. |
| 2005/0284291 | A1* | 12/2005 | Alizadeh-Khiavi et al. ..... 95/90 |
| 2006/0032241 | A1 | 2/2006 | Gontcharov et al. |
| 2006/0054023 | A1 | 3/2006 | Raetz et al. |
| 2006/0079172 | A1 | 4/2006 | Fleming et al. |
| 2006/0148642 | A1 | 7/2006 | Ryu et al. |
| 2006/0249019 | A1 | 11/2006 | Roychoudhury et al. |
| 2008/0078289 | A1 | 4/2008 | Sergi et al. |
| 2008/0119356 | A1 | 5/2008 | Ryu et al. |
| 2008/0127821 | A1 | 6/2008 | Noack et al. |
| 2008/0135060 | A1 | 6/2008 | Kuo et al. |
| 2008/0182506 | A1 | 7/2008 | Jackson et al. |
| 2008/0210768 | A1 | 9/2008 | You |
| 2008/0293976 | A1 | 11/2008 | Olah et al. |
| 2009/0000621 | A1 | 1/2009 | Haggblom et al. |
| 2009/0120288 | A1 | 5/2009 | Lackner et al. |
| 2009/0220388 | A1 | 9/2009 | Monzyk et al. |
| 2009/0260372 | A1 | 10/2009 | Skinner et al. |
| 2010/0076605 | A1 | 3/2010 | Harrod et al. |
| 2010/0154636 | A1 | 6/2010 | Liu et al. |
| 2010/0254868 | A1 | 10/2010 | Obee et al. |
| 2010/0262298 | A1 | 10/2010 | Johnson et al. |
| 2010/0278711 | A1 | 11/2010 | Find |
| 2011/0064607 | A1 | 3/2011 | Hedman |
| 2011/0079143 | A1 | 4/2011 | Marotta et al. |
| 2011/0085933 | A1 | 4/2011 | Mazyck et al. |
| 2011/0146494 | A1 | 6/2011 | Desai et al. |
| 2011/0179948 | A1 | 7/2011 | Choi et al. |
| 2011/0189075 | A1 | 8/2011 | Wright et al. |
| 2011/0192172 | A1 | 8/2011 | Delacruz |
| 2011/0198055 | A1 | 8/2011 | Meirav et al. |
| 2011/0206572 | A1 | 8/2011 | McKenna et al. |
| 2011/0250121 | A1 | 10/2011 | Schmidt |
| 2011/0262327 | A1 | 10/2011 | Dillon et al. |
| 2011/0265648 | A1 | 11/2011 | Meirav |
| 2011/0269919 | A1 | 11/2011 | Min et al. |
| 2011/0277490 | A1 | 11/2011 | Meirav |
| 2011/0296872 | A1* | 12/2011 | Eisenberger ..... 62/640 |
| 2012/0004092 | A1 | 1/2012 | Raatschen et al. |
| 2012/0012005 | A1 | 1/2012 | Burke |
| 2012/0052786 | A1 | 3/2012 | Clawsey |
| 2012/0076711 | A1 | 3/2012 | Gebald et al. |
| 2012/0148858 | A1 | 6/2012 | Wu |

(56) References Cited

U.S. PATENT DOCUMENTS

| | | | |
|---|---|---|---|
| 2012/0168113 | A1 | 7/2012 | Karamanos |
| 2012/0216676 | A1 | 8/2012 | Addiego et al. |
| 2012/0222500 | A1 | 9/2012 | Riess et al. |
| 2013/0052113 | A1 | 2/2013 | Molins et al. |

FOREIGN PATENT DOCUMENTS

| | | | |
|---|---|---|---|
| CN | 101500704 | A | 8/2009 |
| CN | 201363833 | Y | 12/2009 |
| EP | 0475493 | A2 | 3/1992 |
| ES | 2387791 | A1 | 10/2012 |
| JP | 56-158126 | A | 12/1981 |
| JP | 59-225232 | A | 12/1984 |
| JP | 60194243 | | 10/1985 |
| JP | 02-092373 | A | 3/1990 |
| JP | 5-161843 | A | 6/1993 |
| JP | 09085043 | A | 3/1997 |
| JP | 2001-170435 | A | 6/2001 |
| JP | 2001232127 | A | 8/2001 |
| JP | 3207936 | B2 | 9/2001 |
| JP | 2005-090941 | A | 4/2005 |
| JP | 2006275487 | A | 10/2006 |
| JP | 2009-202137 | A | 9/2009 |
| JP | 2010-149086 | A | 7/2010 |
| WO | WO 88-05693 | A1 | 8/1988 |
| WO | WO 0208160 | A1 | 1/2002 |
| WO | WO 0212796 | A2 | 2/2002 |
| WO | WO 2007128584 | A1 | 11/2007 |
| WO | WO 2008155543 | A2 | 12/2008 |
| WO | WO 2009126607 | A2 | 10/2009 |
| WO | WO 2010091831 | A1 | 8/2010 |
| WO | WO 2010124388 | A1 | 11/2010 |
| WO | WO 2011114168 | A1 | 9/2011 |
| WO | WO 2011146478 | A1 | 11/2011 |
| WO | WO 2012134415 | A1 | 10/2012 |
| WO | WO 2012158911 | A2 | 11/2012 |
| WO | WO 2013074973 | A1 | 5/2013 |
| WO | WO 2013106573 | A1 | 7/2013 |

OTHER PUBLICATIONS

Gesser, H.D., "The Reduction of Indoor Formaldehyde Gas and that Emanating from Urea Formaldehyde Foam Insulation (UFFI)", Environmental International, vol. 10, pp. 305-308, 1984.
Jones, Christopher W., "CO2 Capture from Dilute Gases as a Component of Modern Global Carbon Management", Annual Review of Chemical and Biomolecular Engineering, vol. 2, pp. 31-52, 2011.
Ma, Chanjuan et al., "Removal of low-concentration formaldehyde in air by adsorption on activated carbon modified by hexamethylene diamine", Carbon, vol. 49, pp. 2869-2877, 2011.
Nuckols, M. L. et al., "Technical Manual: Design Guidelines for Carbon Dioxide Scrubbers", Naval Coastal Systems Center, vol. 4110, pp. 1-83, Revision A, Jul. 1985.
United States Environmental Protection Agency, "Carbon Adsorption for Control of VOC Emissions: Theory and Full Scale System Performance", vol. 450, pp. 88-012, Jun. 1988.
Serna-Guerrero, Rodrigo et al., "Triamine-grafted pore-expanded mesoporous silica for CO2 capture: Effect of moisture and adsorbent regeneration strategies", Adsorption, vol. 16, pp. 567-575, 2010.
International Search Report and Written Opinion, mailed Sep. 5, 2012 for PCT/US2012/024333.
International Search Report and Written Opinion, mailed Jul. 25, 2013 for PCT/US2013/035933.
International Search Report and Written Opinion, mailed Dec. 20, 2013 for PCT/US2013/051077.
International Search Report and Written Opinion, mailed Jan. 3, 2014 for PCT/US2013/042239.
International Search Report and Written Opinion, mailed Mar. 22, 2013 for PCT/US2012/065600.
International Search Report and Written Opinion, mailed Mar. 29, 2013 for PCT/US2013/021033.
International Search Report and Written Opinion, mailed Mar. 17, 2014 for PCT/US2013/070383.
International Search Report and Written Opinion, mailed Jul. 10, 2014 for PCT/US2014/023488.
International Search Report and Written Opinion, mailed Aug. 15, 2014 for PCT/US2014/031009.
International Search Report and Written Opinion, mailed Nov. 24, 2014 for PCT/US2014/055863.
International Search Report and Written Opinion, mailed Nov. 24, 2014 for PCT/US2014/056097.
Sidheswaran, Meera A. et al., "Energy efficient indoor VOC air cleaning with activated carbon filter (ACF) filters", Building and Environment, vol. 47, Apr. 2011, pp. 357-367.
Zorflex® ACC, 100% Activated Woven Carbon Cloth, Calgon Carbon Corporation, 2008, www.calgoncarbon.com, 2 pages.
Zorflex® ACC, 100% Activated Woven Carbon Cloth, Calgon Carbon Corporation, 2011, www.calgoncarbon.com, 2 pages.
Gray, M. L. et al., "Performance of immobilized tertiary amine solid sorbents for the capture of carbon dioxide", International Journal of Greenhouse Gas Control, vol. 2, Issue 1, Jan. 2008, pp. 3-8.
International Search Report and Written Opinion, mailed Sep. 27, 2011, for PCT/US2011/036801.
International Preliminary Report on Patentability, mailed Nov. 29, 2012, for PCT/US2011/036801.
"EPA Ventilation and Air Quality in Offices, Fact Sheet" United States Environmental Protection Agency, Air and Radiation (6609J), Revised Jul. 1990.
International Preliminary Report on Patentability, mailed Aug. 22, 2013, for PCT/US2012/024333.
International Preliminary Report on Patentability, mailed Nov. 28, 2013 for PCT/US2012/038343.
International Preliminary Report on Patentability, mailed May 30, 2014 for PCT/US2012/065600.
International Preliminary Report on Patentability, mailed Jul. 24, 2014 for PCT/US2013/021033.
International Preliminary Report on Patentability, mailed Oct. 23, 2014 for PCT/US2013/035933.
International Preliminary Report on Patentability, mailed Dec. 4, 2014 for PCT/US2013/042239.
International Preliminary Report on Patentability, mailed Jan. 29, 2015 for PCT/US2013/051077.
International Search Report and Written Opinion, mailed Dec. 19, 2013 for PCT/US2013/061422.
International Preliminary Report on Patentability, mailed Apr. 2, 2015 for PCT/US2013/061422.
International Preliminary Report on Patentability, mailed May 28, 2015 for PCT/US2013/070383.
International Search Report and Written Opinion, mailed Sep. 2, 2014, for PCT/US2014/035114.
International Search Report and Written Opinion, mailed May 15, 2015, for PCT/US2015/015690.
Goeppert et al., "Carbon Dioxide Capture from the Air Using a Polyamine Based Regenerable Solid Adsorbent," J. Am. Chem. Soc., vol. 133, No. 50, Nov. 21, 2011 (Nov. 21, 2011) pp. 20164-20167 entire document.
International Search Report and Written Opinion, mailed May 5, 2014, for PCT/US2014/011078.
Hua Jian, "Engineering materials for pollution control of environment", Sep. 2009, p. 106-108, Chemical Industrial Press, China.
"Encyclopedia of organic materials", Chinese Chemical Society, Division of Petrochemistry, Dec. 1989, p. 141-142, Chemical Industrial Press, China.
Translation of Second Office Action (with Search Report), dated Nov. 9, 2015, for CN Application No. 201280023387.1.
Wang, Yu-dong "Principles and technologies for natural gas processing" China Petrochem Press, Feb. 28, 2011, pp. 43-45.
Translation of Third Office Action (with Search Report), dated Mar. 21, 2016, for CN Application No. 201280023387.1.

* cited by examiner

SORBENTS FOR CARBON DIOXIDE REDUCTION FROM INDOOR AIR

CROSS-REFERENCE TO RELATED APPLICATIONS

The present application is a 35 U.S.C. §371 national stage entry of PCT/US2012/038343, having an international filing date of May 17, 2012, and claiming priority to U.S. provisional patent application No. 61/575,577, filed Aug. 23, 2011, and to PCT Application No. PCT/US2011/036801, filed May 17, 2011. Each of these disclosures are herein incorporated by reference in their entireties.

TECHNICAL FIELD

The present application generally relates to sorbents for reduction of substances from air and in particular to sorbents for reduction of carbon dioxide from indoor air.

BACKGROUND

Amines are organic compounds and functional groups that contain a basic nitrogen atom with two or less hydrogen atoms. Primary amines have two hydrogen atoms attached, secondary amines have one hydrogen atom. Amines are derivatives of ammonia, wherein one or more hydrogen atoms have been replaced by a substituent such as an alkyl or aryl group.

Amine gas treating is a well known process in the art using various forms of amines to remove carbon dioxide ($CO_2$) from gases present in refineries, petrochemical plants and natural gas processing plants.

Removal of $CO_2$ from controlled, sealed environments (submarines, spacecrafts or space suits, and the like) is also known in the art.

SUMMARY

There is thus provided in accordance with an embodiment of the present disclosure a sorbent for $CO_2$ reduction from indoor air. The sorbent comprises a solid support and an amine-based compound attached to the support. The sorbent captures at least a portion of the $CO_2$ within the indoor air. The sorbent may be regenerated by streaming outdoor air through the sorbent to release at least a portion of the captured $CO_2$. The sorbent is structured to allow indoor air to flow therein with relatively low flow resistance and relatively rapid reaction kinetics. Regeneration may be performed at relatively low temperatures, thereby minimizing the thermal energy required for regenerating the sorbent.

According to some embodiments of the present disclosure, there is provided a sorbent for reduction of $CO_2$ from indoor air of an enclosed space. The sorbent includes a solid support and an amine-based compound supported by the support. The amine-based compound is provided to capture at least a portion of the $CO_2$ within the indoor air and release at least a portion of the captured $CO_2$ by streaming outdoor air through the sorbent. The support may include a porous solid material or a fine particle solid material. The support may include a clay. The support may include a plurality of particles, and in some embodiments, the plurality of particles have an average diameter dimension in the range of 0.1-10 millimeters, 0.2-3 millimeters, or 0.3-1 millimeters. In some embodiments, the amine-based compound includes at least 50% or 25% secondary amines.

According to some embodiments, the support is initially in the form of fine particles and is mixed with an amine-based compound, and thereafter formed as a plurality of particles. In some embodiments, the support includes particles, fine particles, or a powder based solid, wherein the fine particles are agglomerated into larger particles so as to facilitate air flow through the sorbent.

According to some embodiments of the present disclosure, there is provided a method for reducing $CO_2$ from an enclosed environment. The method includes providing a sorbent and a support for the sorbent, the sorbent includes an amine-based or amine-like compound; streaming a first gas containing $CO_2$ from inside an enclosed environment through the sorbent such that the sorbent captures at least some of the $CO_2$ of the first gas; and streaming a second gas containing less $CO_2$ than the first gas from outside the environment through the sorbent such that the sorbent releases at least some of the captured $CO_2$ to the second gas. The enclosed environment may be a private, public, residential, or commercial space. The first gas may be indoor air and/or the second gas may be outdoor air. The method may further include providing the sorbent and the support in communication with a heating, ventilation, and air conditioning (HVAC) system. In some embodiments, the HVAC system is configured to stream the second gas through the sorbent.

According to some embodiments, a system for reducing $CO_2$ contained in air from an enclosed environment is provided where the system includes an HVAC system and a sorbent in communication with the HVAC system. The sorbent includes a solid support, and an amine-based compound being supported by the support. The HVAC system is configured to flow indoor air over and/or through the sorbent and the amine-based compound is configured to capture at least some of the $CO_2$ within the indoor air. In addition, the HVAC system is configured to flow outdoor air over and/or through the sorbent such that at least a portion of the $CO_2$ captured by the sorbent is released therefrom.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The principles and operations of the systems, apparatuses and methods according to embodiments of the present disclosure may be better understood with reference to the drawings, and the following description. These drawings are given for illustrative purposes only and are not meant to be limiting.

DETAILED DESCRIPTION

Figure 1:
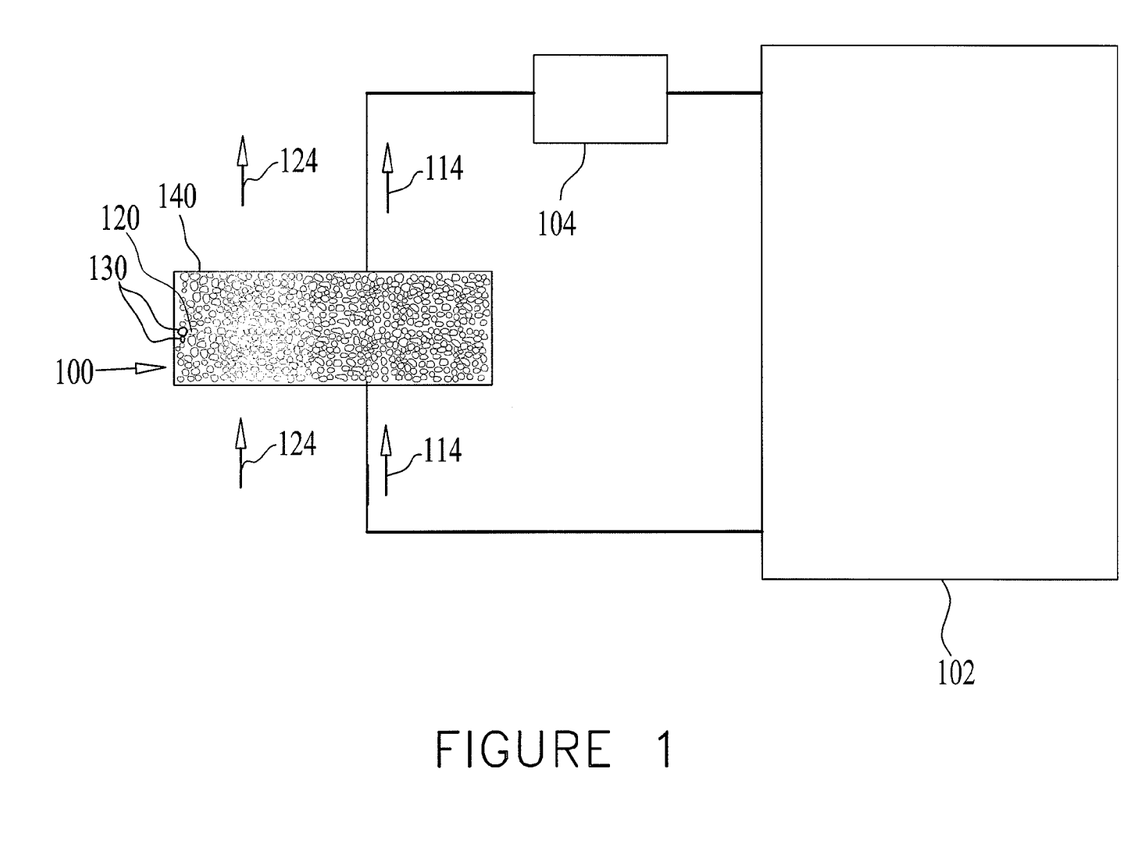
FIG. 1 is a schematic illustration of a sorbent construct according to some embodiments of the present disclosure.

FIG. 1 is schematic illustration of a sorbent construct, according to some embodiments of the present disclosure. As seen in FIG. 1, a sorbent construct 100 (which may also be referred to as a filter or scrubber, for example) may be in fluid communication with indoor air from an enclosed environment 102.

The enclosed environment 102 may be, for example, an office building, a commercial building, a bank, a residential building, a house, a school, a factory, a hospital, a store, a mall, an indoor entertainment venue, a storage facility, a laboratory, a vehicle, an aircraft, a ship, a bus, a theatre, a partially and/or fully enclosed arena, an education facility, a library and/or other partially and/or fully enclosed structure and/or facility which can be at times occupied by equipment, materials, live occupants (e.g., humans, animals, synthetic organisms, etc.) and/or any combination thereof.

Indoor air within and around buildings and structures is affected by a plurality of substances, comprising contaminants. Among these contaminants, usually with the highest concentration, is $CO_2$. There are other contaminants, such as carbon monoxide, nitrous oxides and sulfur oxides, which may appear in relatively lower concentrations. Another class of such contaminants is a group of species of organic vapors, broadly referred to as Volatile Organic Compounds (VOC). The sources of these vapors include, inter alia, the human occupants themselves—from respiration and perspiration to clothing and cosmetics—as well as building materials, equipment, food and consumer products, cleaning materials, office supplies or any other materials emitting VOCs. Additional contaminants may be microorganisms including, inter alia, bacteria, viruses and fungi and airborne particles.

In a human occupied enclosed environment 102, the concentration of $CO_2$ within the indoor air is typically in the range of 400-5000 parts per million (ppm). Additionally, the concentration of $CO_2$ in the indoor air may be in the range of 400-2000 ppm. Moreover, the concentration of $CO_2$ in the indoor air may be in the range of 500-1500 ppm. Furthermore, the concentration of $CO_2$ in the indoor air may be in the range of 800-1200 ppm.

The concentration of $CO_2$ in outdoor air, external to the enclosed environment 102, is typically in the range of 300-500 ppm. Higher levels may be seen in the vicinity of combustion or living organisms. There are concerns about a continual increase in atmospheric $CO_2$ levels, so atmospheric levels may be higher in the future.

In some embodiments the concentration of $CO_2$ in outdoor air may be lower than in the indoor air by a range of 100-2000 ppm. Additionally, the concentration of $CO_2$ in outdoor air may be lower than in the indoor air by 1200 ppm or less. Furthermore, the concentration of $CO_2$ in outdoor air may be lower than in the indoor air by 800 ppm or less. Additionally, the concentration of $CO_2$ in the outdoor air may be lower than in the indoor by 400 ppm or less.

The sorbent construct 100 is provided to reduce the concentration of substances present therein by scrubbing the substances from indoor air 114. The sorbent construct 100 may comprise a sorbent 120 that is composed of at least two functional groups of materials: a passive support and an active compound. The support materials generally provide the mechanical and physical structure of the sorbent and the active compound attracts and captures $CO_2$.

Following the capture of the substances, the sorbent construct 100 may be regenerated by urging the release of at least a portion of the substances, such as $CO_2$, therefrom. Regeneration is a very important aspect of sorbent performance and often the step where the most energy is required, as described hereinbelow.

Regeneration may be performed by a combination of heating, purging, pressure change, electrical energy, and/or any combination thereof. Additionally, the release of substances can be achieved by a combination of heating and purging with air or other purge gas. The released substances may be expunged into the atmosphere or otherwise collected, disposed of, sequestered, and/or any combination thereof.

In accordance with some embodiments the regeneration may be performed by streaming purge gas 124 through the sorbent construct 100 for release of at least a portion of the substances, such as $CO_2$, therefrom. Ideally such incoming purge gas would have very low $CO_2$ concentrations. Although outdoor air contains an amount of $CO_2$, use of outdoor air as a purge gas 124 for regeneration of the sorbent construct 100 may be advantageous due to the availability and cost efficiency of outdoor air. In accordance with some embodiments the $CO_2$ concentration of the outdoor air may be smaller by any amount than the $CO_2$ concentration of the indoor air for allowing the outdoor air to purge and thus regenerate the sorbent 120.

The purge gas 124 may be introduced into the sorbent construct 100 at a suitable temperature for effective regeneration, such as in the range of approximately 20-200° C. In accordance with some embodiments the temperature of the purge gas 124 is relatively low such as lower than 100° C., or in the range of approximately 30-80° C., or as low as in the range of approximately 30-60° C. Accordingly, if outdoor air is used as purge gas it may be required to be relatively minimally heated, or in accordance with some embodiments, may be introduced into the sorbent construct 100 without any prior heating.

The purge gas 124 may comprise air, outdoor air, indoor air, $N_2$ a combination thereof or any other suitable gas. In one preferred embodiment, outdoor air is used as purge gas.

The support component of the sorbent 120 may be formed of any suitable material. In a non-limiting example the support may be formed of generally chemically inert materials. Additionally, the support may be formed of adsorbent materials, such as gels, molecular sieves, nanotube-containing materials, porous materials, fiber based materials, sponge-like materials, electrically and/or electro-magnetically charged liners or objects, porous organic polymers, any other chemical, biological attractants, and/or any combination thereof. The adsorbent materials may comprise ion exchange resins, polymeric absorbent resins, acrylic ester polymers, polystyrene divinyl benzene, polymethyl methacrylate (PMMA), polystyrene, styrene divinylbenzene (SDB), fly ash, carbon, activated carbon, carbon nanotubes, or alumina nanoparticles, for example. Additional porous materials may comprise zeolite, synthetic zeolite, porous alumina, porous minerals, silica, porous silica, silica nanoparticles, fumed silica, activated charcoal and metal organic frameworks, for example. An additional porous material may be clay, including aluminum phyllosilicates such as bentonite, montmorillonite, ball clay, fuller's earth, kaolinite, attapulgite, hectorite, palygorskite, saponite, and sepiolite, for example.

In some embodiments, the support may comprise a combination of several different adsorbent materials.

Some of these materials may be available from a variety of commercial sources, such as from BASF SE of Ludwigshafen, Germany; Clariant SE of Frankfurt am Main Switzerland, Europe; The Cabot Corporation of Boston, Mass., USA, and Evonik Industries of Essen, Germany, for example.

The support may be formed in any suitable configuration, such as a solid supporting substrate or solid support formed with a relatively large total surface area. The solid support may comprise any suitable material which is not a liquid. For example, the solid support may be formed of a plurality of elements such as solid particles 130 or sheets, for example. The total surface area may be generally defined as the sum of the surface areas of each element forming the solid support.

In FIG. 1 exemplary particles 130 are shown. The particles 130 may be configured in any suitable shape or method such as powders, fibers, granules, beads, pellets, extrudates or a combination thereof. The fibers may be any suitable fiber such as carbon fiber, silica fibers or polymer fibers, for example. The fibers may be weaved or intertwined to form a fabric or a paper-like material.

The fibers, granules, beads, pellets and extrudates may be formed of any suitable material as described hereinabove. The support may be formed of a plurality of thin sheets. The sheets may comprise natural or synthetic fiber based materials, paper, natural fabrics, or synthetic fabrics. The sheets may be formed in any suitable size, such as with a thickness in the range of approximately one micron to two centimeters. Additionally, the range may be approximately 2-80 millimeters, for example. In some embodiments the sorbent 120 may comprise a large surface area (such as the total surface area of the plurality of particles 130), for example in the range of 10-1000 square meters per gram.

The particles 130 may be formed with dimensions ensuring that the particles 130 are not too fine thereby forming an overly dense layer, which may prevent the flow of the indoor air 114 through the sorbent construct 100. Additionally the particles 130 may be formed with dimensions ensuring that a total surface area of the plurality of particles 130 is sufficiently large for allowing the indoor air 114 to have maximal contact with the particles 130 for maximal adsorption of the substance, such as the $CO_2$.

In a non-limiting example, the average diameter of the particles 130 may be in the range of approximately 0.1-10 millimeters. Not all particles are likely to be identical in shape and size, therefore the typical or average particle comprises an average of an aggregate of such particles. In another non-limiting example, the average diameter of the particles 130 may be in the range of approximately 0.2-3 millimeters. In yet another non-limiting example, the diameter of a particle 130 may be in the range of approximately 0.3-1 millimeters. The diameter of the particle 130 may be measured as the approximate diameter, wherein the particle is a granule or bead, or may be measured as a cross section diameter, wherein the particle is a fiber, an extrudate or a pellet.

The sorbent 120 may be arranged in any suitable manner. For example, the sorbent 120 may be placed within an enclosure 140 formed in any suitable configuration. The particles 130 or thin sheets or any other sorbent 120 may be relativity densely packed within the enclosure 140 at a density allowing the indoor air 114 to have maximal contact with the particles 130 for maximal interaction therefrom yet not overly dense, which may prevent the flow of the indoor air 114 through the sorbent construct 100.

Exemplary enclosures 140 and air treatment modules are disclosed in applicant's US Publication No. 20110198055, which is incorporated herein by reference in its entirety.

The active compound in the sorbent 120 may be an amine-based or amine-like compound. The amine compound is suitable for adsorbing $CO_2$ present in the indoor air 114. The amine-based compound may comprise any suitable amine, such as a primary or secondary amine, or a combination thereof. Additionally, the amine-based compound may range from relatively simple single molecules, such as ethanolamine, to large molecule amino polymers such as polyethylenimine. The amine-based compound may comprise monoethanolamine (MEA), ethanolamine, methylamine, branchedpolyethyleneimine (PEI), linear polyethyleneimine (PEI), diethanolamine (DEA), dimethylamine, diethylamine, diisopropanolamine (DIPA) tetraethylenepentamine (TEPA), methyldiethanolamine (MDEA), methylethanolamine, and any of a number of polyamines such as polyethylenimine, or a combination thereof, for example.

The amine-based compound may be liquid or solid or any other suitable phase.

It is known in the art that amines selectively capture a relatively large amount of $CO_2$. As described hereinabove, the sorbent construct 100 is employed to reduce substances, such as $CO_2$, within the indoor air exiting the enclosed environment 102. Indoor air typically comprises a relatively low concentration of $CO_2$, ranging from 400-2000 ppm. Thus use of an amine-based compound is highly effective in reducing the concentration of $CO_2$ within indoor air. Additionally, indoor air is composed of other gas compounds, predominantly about 75-82% or 79-82% Nitrogen; and 15-21% or 18-21% Oxygen. Water may also be present depending on the humidity level of the indoor air. For example, there may be a presence of 0%-5% water in the indoor air. Therefore it is advantageous to use an amine-based compound which allows selective capturing of the $CO_2$, and possibly other substances, while avoiding saturation of the sorbent construct 100 with water or the other indoor air gas compounds. An example of $CO_2$ adsorption by an amine-based compound supported by a solid support is described in reference to FIGS. 2, 4 and 6.

In accordance with some embodiments the amine-based compound may comprise a relatively large fraction of secondary amines. In some embodiments like diethanolamine, the amines are 100% secondary amines. In other embodiments, like certain polyamines, between 25%-75% of amines are secondary amines. Additionally, the amine-based compound may comprise at least 50% secondary amines. Moreover, the amine-based compound comprises at least 25% secondary amines.

Primary amines, which comprise $NH_2$ elements, create strong chemical reaction with $CO_2$. Secondary amines, which comprise a single hydrogen, i.e. NH, create weaker chemical reaction with $CO_2$ yet still efficiently and selectively capture the $CO_2$. Accordingly, secondary amines require less energy for releasing the captured $CO_2$ therefrom than the energy (such as thermal energy) required for releasing $CO_2$ from primary amines. The more-readily releasing secondary amines allow satisfactory capturing of the $CO_2$ from indoor air while also allowing relatively rapid and low energy regeneration of the sorbent 120. Accordingly, regeneration of the sorbent 120 may be performed by relatively low-temperature using outdoor air. The ability to regenerate the sorbent with minimal added heat is highly advantageous for treating indoor air.

As described hereinabove, the sorbent 120 may be formed of particles 130, thin sheets or any configuration which provides a relatively large total surface area for contact with substances. This amine-containing solid sorbent allows the indoor air 114 to have maximal contact with the amine-based compound for maximal $CO_2$ removal from the indoor air. This is advantageous for indoor air which typically has a low concentration of $CO_2$, as described hereinabove. Additionally, use of the amine-containing support with a relatively large total surface area allows disposing the sorbent construct 100 within a relatively compact, small sized enclosure 140.

Additionally, the sorbent 120 may be formed of particles 130, thin sheets or any structure which is permeable to a gas flowing through sorbent 120 with relatively low flow resistance. The particles 130 and thin sheets allow the indoor air to readily flow between the particles 130 or sheets. As described hereinabove, the sorbent 120 may be formed of porous materials thereby allowing the indoor air to also flow through the particles 130 or sheets and thus enhancing the gas permeability of the sorbent 120.

Moreover, the sorbent 120 structured with a relatively large total surface area and with relatively high fluid permeability provides for relatively rapid reaction kinetics and thus a relatively large quantity of $CO_2$ is captured quickly by the amine-containing support. Reaction kinetics or chemical kinetics may be defined as the rate of a chemical process, such as the rate the $CO_2$ is captured by the sorbent 120.

Low flow resistance and rapid reaction kinetics is advantageous for capturing $CO_2$ from indoor with a relatively low $CO_2$ concentration.

Low flow resistance and a relatively large total surface area of the sorbent 120 also allows the purge air 124 to readily release the $CO_2$ from the sorbent 120, as explained hereinabove. Consequently, the purge air 124 may regenerate the sorbent with minimal added heat in a relatively short time and additionally the purge air 124 may comprise outdoor air.

Examples of chemically inert supports with a large total surface may comprise clay, silica, metal oxides like alumina, or a combination thereof. For example, acid-treated bentonite clay chemically binds well with the hydroxyl group of diethanolamine (DEA) to form a stable sorbent; it is known in the art that polyethylenimines (PEI) attach to silica surfaces, thereby, these supports and amine may be used as a sorbent for selective and efficient $CO_2$ removal from indoor air.

An example of large surface area solids carrying liquid amines is described by Siriwardane (U.S. Pat. No. 6,908, 497), where bentonite clay is impregnated with an amine, resulting in amine impregnated clay that acts as a selective adsorbent of $CO_2$.

The amine-containing sorbent may be synthesized in any suitable method, known in the art. In a non-limiting example, a solid support may be impregnated by the amine-based compound in any suitable manner, such as by spraying, dripping or immersion within a solution of the amine-based compound, for example. The impregnation may additionally or alternatively be mechanically stimulated, with catalysts, or with external energy sources, such as heat.

In accordance with some embodiments, the solid support may initially comprise particles, which are thereafter impregnated by an amine-based compound, as described hereinabove and as exemplified in example 1.

In accordance with other embodiments, the solid support may initially comprise fine particles, such as a powder. The fine particles may be mixed with the amine-based compound, such as by immersion of the fine particles in an amine-containing liquid or solution to form an amine-containing powder for example, as described in example 2.

In accordance with other embodiments the amine-containing powder is agglomerated to form the support by standard procedures, such as granulation for forming granules or beads and pelletization or extrusion for forming pellets or extrudates, for example, as described in example 3.

If solvents are used in the process of synthesizing the support and the amine, the resulting sorbent may need to be dried in any suitable manner.

The amine-based compound may be a liquid, a solid or may be initially a solid solved in a solvent. For example, a solved amine-based compound may comprise diethanolamine (DEA), which may be solved in any suitable solvent such as Dichloromethane (DCM). Additionally, the solved amine-based compound may comprise polyethyleneimine (PEI), which may be solved in any suitable solvent, such as water, ethanol, methanol, ethylene glycol (EGW) or propylene glycol (PGW), for example.

The conditions and parameters for forming the amine-containing support may vary according to the properties of the selected support and the selected amine-based compound.

The sorbent constructs 100 may be placed within the enclosed environment 102. Alternatively, the sorbent constructs 100 may be placed out of the enclosed environment 102 and the indoor air 114 and/or the outside air 124 may be introduced therein in any suitable manner.

The examples as set forth herein are meant to exemplify some of the various aspects of carrying out the disclosed embodiments and are not intended to limit the disclosure in any way.

The following examples 1, 2 and 3 describe methods for synthesizing the amine-containing support. It is appreciated that the amine-containing support may be composed in any suitable method.

Example 1

Bentonite powder may be initially formed into particles, such as granules or beads by any standard granulation method or may be formed into pellets or extrudants by any standard pelletization or extrusion method.

In one embodiment the bentonite powder may be formed into high porosity, 8-32 mesh acid treated bentonite pellets with a porosity of 20-500 $[m^2/grams]$ The granules or pellets may be dry sprayed by a liquid amine-based compound, such as diethanolamine (DEA), through a nozzle using a pump. The DEA may be solved by any suitable solvent such as by Dichloromethane (DCM). Additionally, a mixture of solved DEA and any other amine or compound may be used. For example a mixture of DEA and tetraethylenepentamine (TEPA) with a 90:10 DEA to TEPA ratio may be used. In another example a 70:30 DEA to TEPA ratio may be used.

Alternately, the particles may be immersed in the liquid amine-based solution and thereafter dried. An amine impregnated bentonite mixture is formed.

The amine to clay ratio may vary, though the ratio is typically in the range of 30-50 grams of amine to 100 grams of clay.

A porosity agent, such as cellulose, may be added for enhancing the porosity of the particles. Another added porosity agent may be DRIERITE® commercially available from W.A. Hammond Drierite Co., Ltd.

The particles are used to form the amine-containing support.

Example 2

A powder, such as bentonite powder with a porosity of 20-500 [$m^2$/grams], may be dried by initially baking it at a temperature of 300-350° C. and thereafter at a temperature of 500-550° C. The dried powder may be placed in a drum mixer. A liquid amine-based compound, such as solved diethanolamine (DEA), may be sprayed through a nozzle using a pump while continuously mixing the bentonite and amine-based compound mixture. Alternatively, the liquid amine-based compound may be slowly dripped on the powder.

The DEA may be solved by any suitable solvent such as by Dichloromethane (DCM). Additionally, a mixture of solved DEA and any other amine or compound may be used. For example a mixture of DEA and tetraethylenepentamine (TEPA) with a 90:10 DEA to TEPA ratio may be used. In another example a 70:30 DEA to TEPA ratio may be used.

Spraying or dripping should cease when the mixture is saturated and wet drops start to form. The liquid to powder ratio may vary, though the ratio is typically in the range of 30-50 grams of liquid to 100 grams of powder.

The amine impregnated bentonite powder mixture may or may not be further dried.

The amine impregnated bentonite powder is used to form the amine-containing support.

Example 3

An amine impregnated bentonite powder is formed as described in example 2.

The amine impregnated bentonite powder is formed into particles, such as granules or beads by any standard granulation method or may be formed into pellets or extrudates by any standard pelletization or extrusion method.

The particles are used to form the amine-containing support.

During performance of the processes described in examples 1-3 it is recommended to refrain from overheating the amine impregnated bentonite mixture (such as to over than 100° C., for example) to prevent the evaporation of the amines.

In the following examples 4-8 adsorption and regeneration of different examples the sorbent 120 are described. The results of the described examples are shown in graphs of respective FIGS. 2-6. It is appreciated that other materials may be used to form the sorbent 120.

Example 4

10 liters of solid supported amine granules were disposed into an enclosure. The solid supported amine granules comprised untreated bentonite and an amine mixture of DEA and TEPA with a 90:10 DEA to TEPA ratio. The solid supported amine granules were formed generally according to the method of example 1.

Pressure sensors, temperature sensors and double (redundant) high accuracy $CO_2$ sensors were placed both upstream and downstream of the enclosure.

Air at room temperature and standard humidity (48-52%) flowed through the sorbent at 40 Cubic Feet per Minute (CFM), with a $CO_2$ of approximately 1000 ppm.

Figure 2:
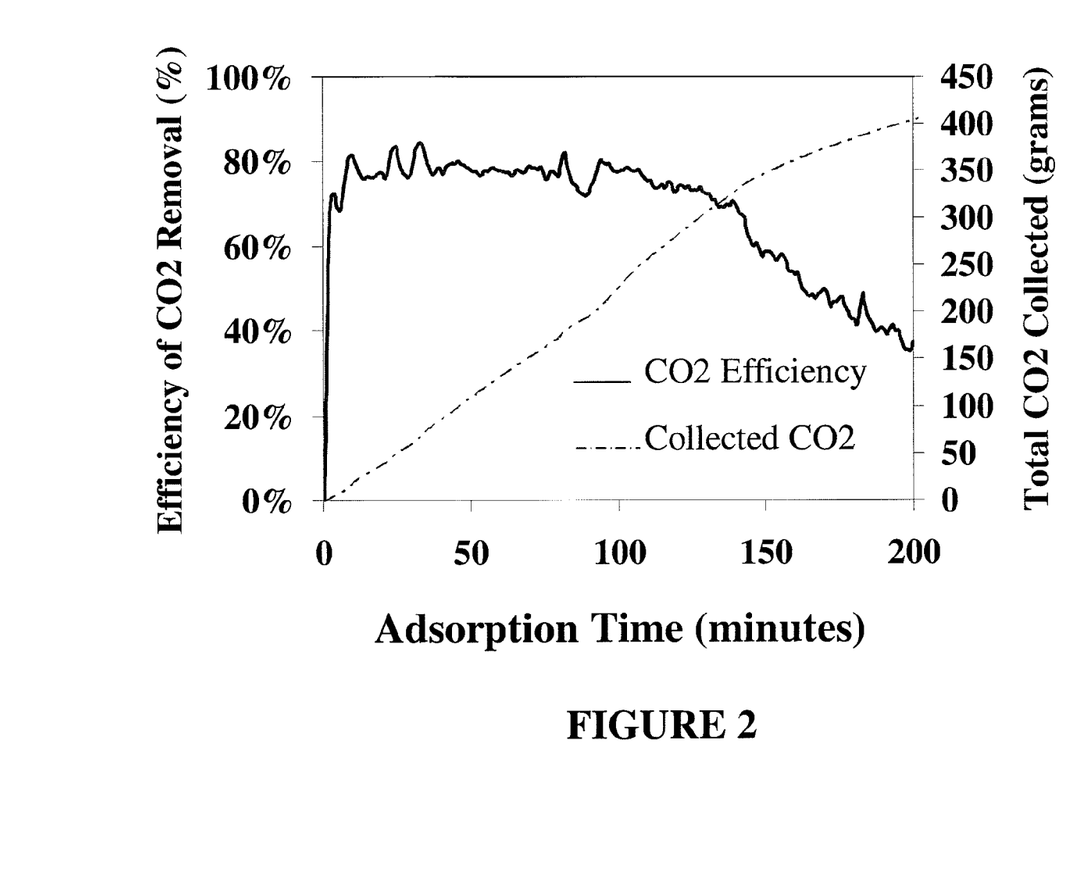
FIG. 2 is a graph showing the operation of the sorbent construct during adsorption of $CO_2$ according to some embodiments of the present disclosure.

The air exiting the sorbent contained a $CO_2$ concentration of approximately 200 ppm, representing about 75-80% efficiency in reducing the $CO_2$ concentration in the air, as seen in FIG. 2. Thereby demonstrating rapid reaction kinetics. This efficiency was maintained for about 100 minutes at which point it began to slowly decline, as expected, representing the gradual saturation of the sorbent.

The volume of $CO_2$ captured in the first two hours was estimated at 250 grams, representing close to 3% of the 8 kG mass of the sorbent. In the above adsorption cycle, which was allowed to continue even after saturation began, approximately 400 grams of $CO_2$ were adsorbed over the course of 3 hours, which is 5% of the sorbent's total mass.

Weighing the enclosure showed a weight increase of approximately 700 grams, indicating about 300 grams of water adsorption in addition to $CO_2$ adsorption. Importantly, it is noted, that the water was desorbed alongside the $CO_2$ and did not appear to have any detrimental effect on the cyclical capacity to adsorb $CO_2$ and regenerate the sorbent and did not appear to have any detrimental effect on the efficiency of the sorbent.

Example 5

Figure 3:
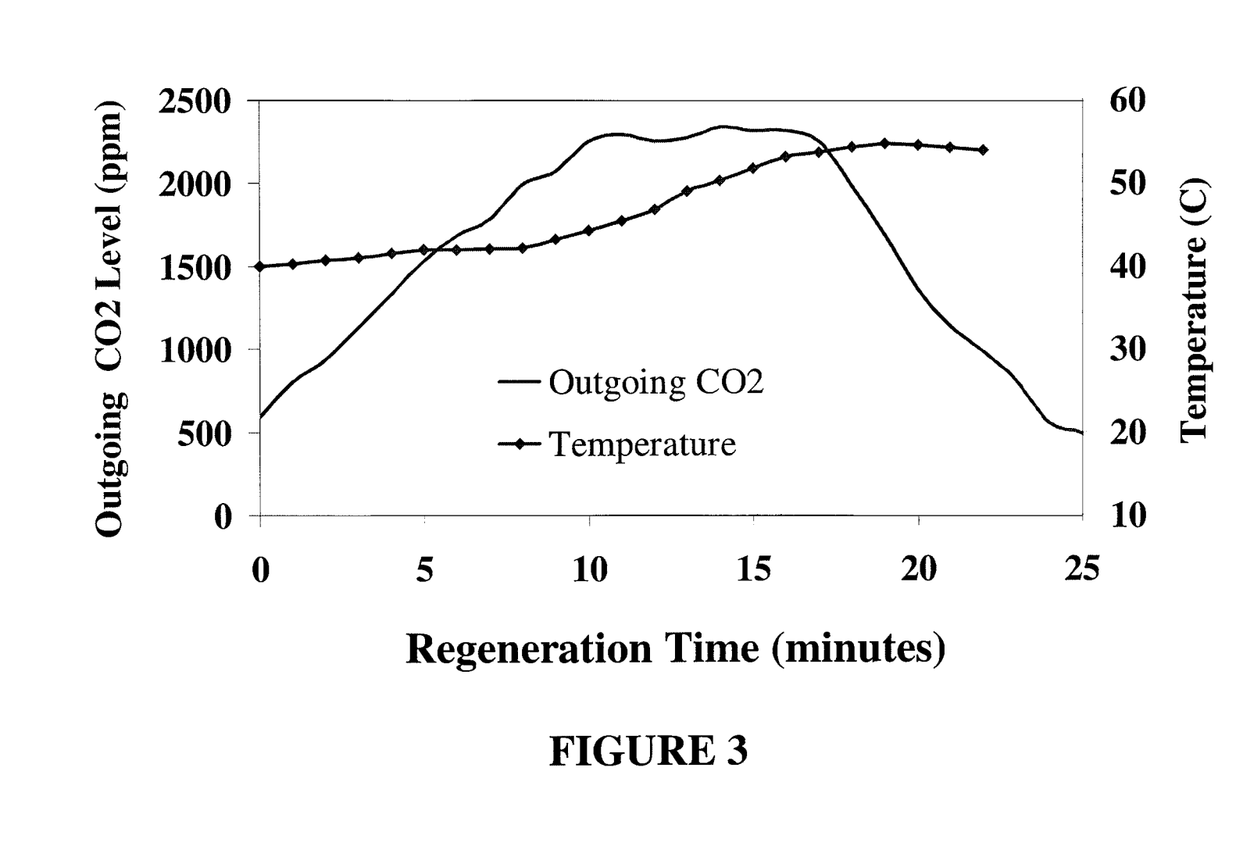
FIG. 3 is a graph showing the operation of the sorbent construct during regeneration of the sorbent construct according to some embodiments of the present disclosure.

Following the adsorption of the $CO_2$, as described in example 4, regeneration of the sorbent was performed. Outdoor air was heated to various degrees during the regeneration cycle using an electric heater placed upstream the sorbent. The air temperature was heated to approximately 40-70° C. and air was streamed at 40 CFM and 80 CFM. The sorbent temperature was raised slowly over the course of 30 minutes to 45-55° C. It was found that there was no need to raise the sorbent above 55° C. at any point, and in fact it appeared that at 45° C. a very high rate of desorption was evident, as seen in FIG. 3.

Outgoing air, exiting the sorbent, reached a $CO_2$ concentration of over 2000 ppm, an excellent result for such low temperatures and high flow rate. The $CO_2$ concentration began to drop within 15 minutes of commencement of the sorbent regeneration and continued to decline rapidly as the $CO_2$ was depleted from the sorbent.

Example 6

0.8972 grams of solid supported amine granules were disposed into an enclosure. The solid supported amine granules comprised acid treated bentonite and an amine mixture of DEA and TEPA with a 90:10 DEA to TEPA ratio. The solid supported amine granules were formed generally according to the method of example 1.

Air at a temperature of 40° C. and 3% moisture flowed through the sorbent at 50 Standard Cubic Centimeters per Minute (SCCM) for 60 minutes, with a $CO_2$ concentration of approximately 1700 ppm.

Figure 4:
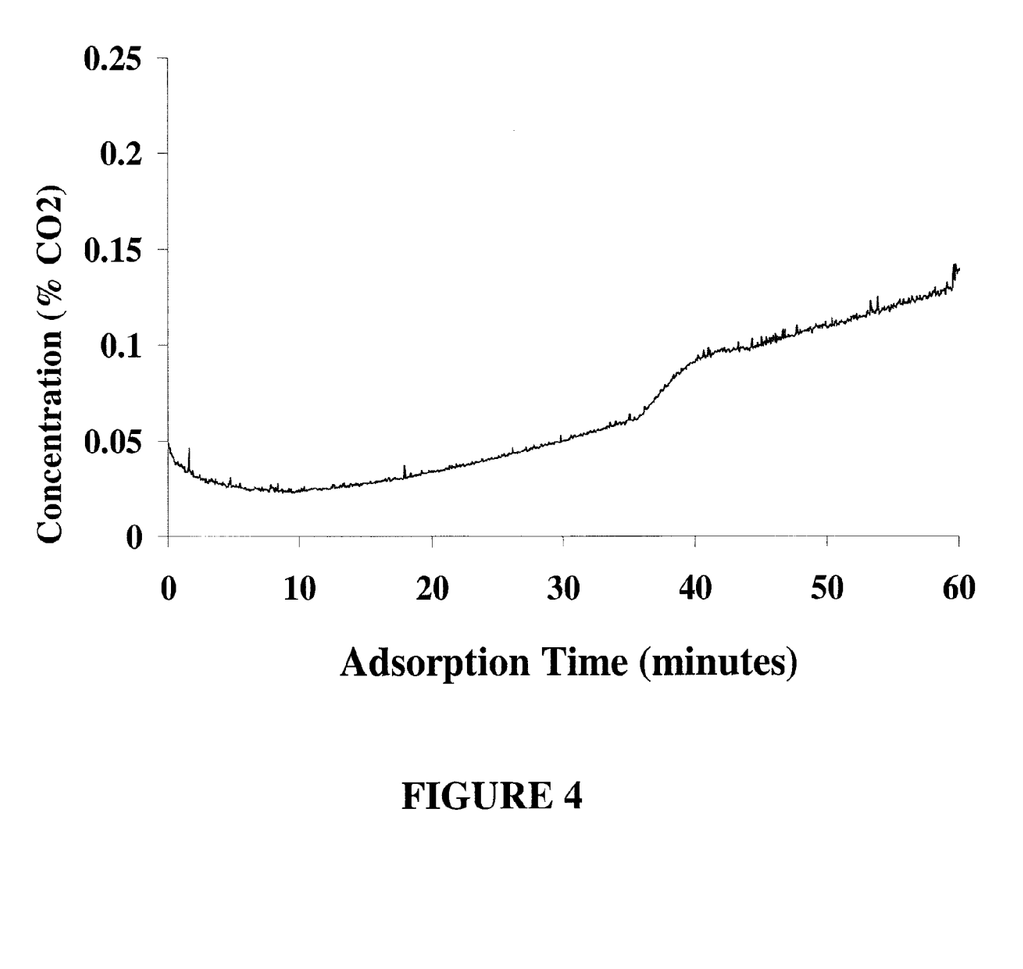
FIG. 4 is a graph showing the operation of the sorbent construct during adsorption of $CO_2$ according to some embodiments of the present disclosure.

As seen in FIG. 4, the $CO_2$ concentration generally continuously rose to approximately 1800 ppm (i.e. 0.18%) after approximately 60 minutes, indicating continuous efficient $CO_2$ adsorption by the sorbent. Thereby demonstrating rapid reaction kinetics.

Example 7

Following the adsorption of the $CO_2$, as described in example 6, regeneration of the sorbent was performed. A purge gas comprising 70 cc of $N_2$ was heated to 50° C. and streamed at 50 SCCM.

Figure 5:
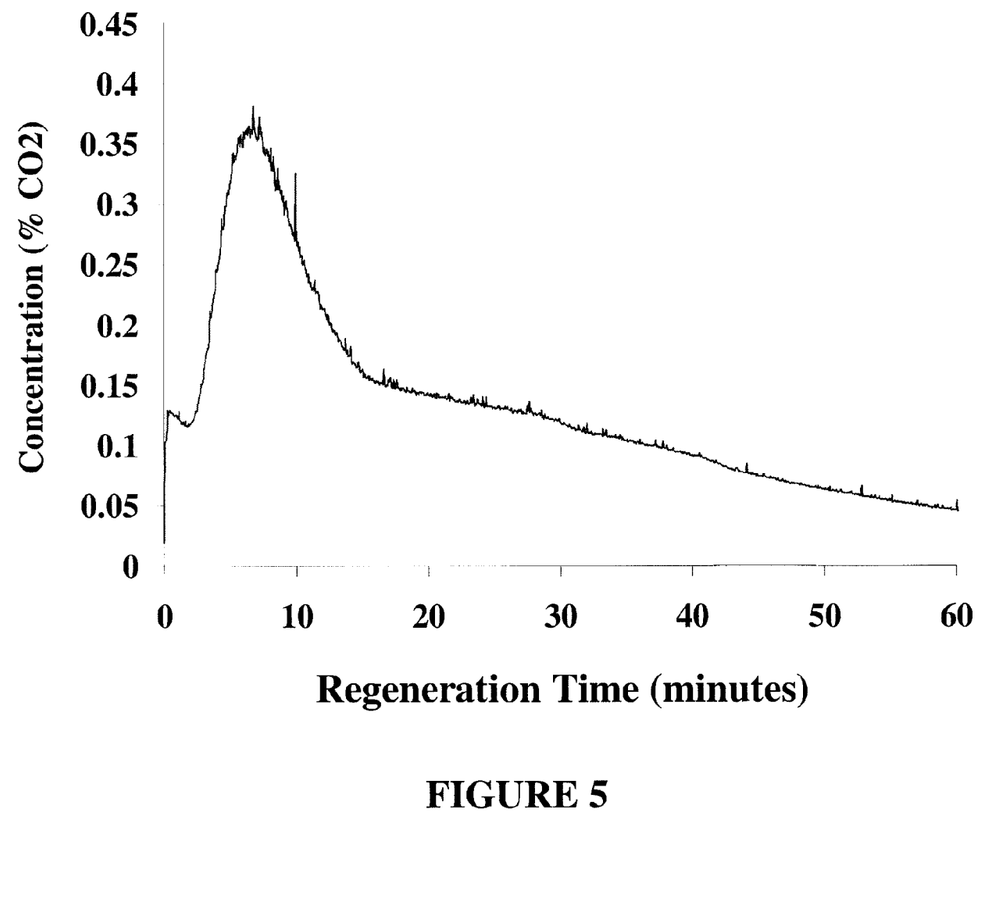
FIG. 5 is a graph showing the operation of the sorbent construct during regeneration of the sorbent construct according to some embodiments of the present disclosure.

Outgoing purge gas, exiting the sorbent, reached a $CO_2$ concentration of over 3800 ppm (i.e. 0.38%), an excellent result. The $CO_2$ concentration began to drop within 8 minutes of commencement of the regeneration cycle and continued to decline rapidly as the $CO_2$ was depleted from the sorbent, as seen in FIG. 5.

Example 8

0.8501 grams of amine-containing powder was disposed into an enclosure. The amine-containing powder comprised untreated bentonite and an amine mixture of DEA and TEPA with a 70:30 DEA to TEPA ratio. The amine-containing powder was formed generally according to the method of example 2.

Air at a temperature of 40° C. and 4% moisture flowed through the sorbent at 15 SCCM for 250 minutes, with a $CO_2$ concentration of approximately 1700 ppm.

Figure 6:
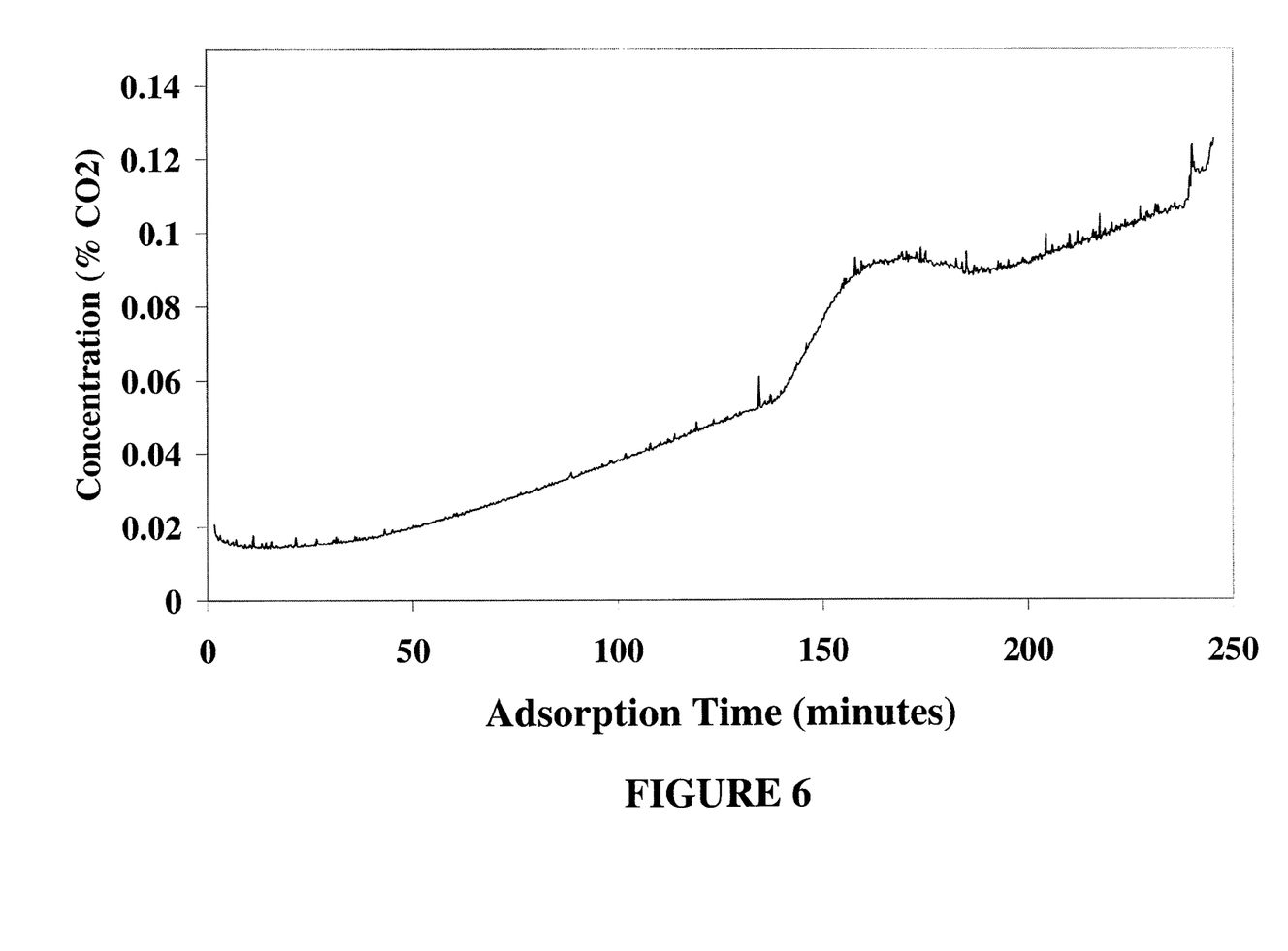
FIG. 6 is a graph showing the operation of the sorbent construct during adsorption of $CO_2$ according to some embodiments of the present disclosure.

As seen in FIG. 6, the $CO_2$ concentration generally continuously rose to approximately 1250 ppm (i.e. 0.125%) after approximately 240 minutes, indicating continuous efficient $CO_2$ adsorption by the sorbent. Thereby demonstrating rapid reaction kinetics In accordance with some embodiments, the sorbent construct 100 may be provided to reduce the $CO_2$ concentration as part of an air management system, such as a Heating, Ventilation and Air-Conditioning ("HVAC") system 104 (e.g., either integral therewith or an in-line component thereof). In some embodiments, the HVAC system 104 is arranged downstream of the sorbent construct 100 as shown in FIG. 1, though other arrangements of the HVAC system relative to the sorbent are within the scope of this disclosure. In air management systems the indoor air exiting the sorbent, following $CO_2$ reduction thereof, may be recirculated into an enclosed environment of the air management system. The sorbent of the sorbent construct 100 may repeatedly undergo an adsorption cycle for adsorbing the $CO_2$ and a regeneration cycle for regenerating the sorbent. Examples of removing substances from HVAC systems are disclosed in applicant's U.S. Pat. No. 8,157,892, which is incorporated herein by reference in its entirety.

It is noted that in accordance with some embodiments, the sorbent construct 100 described herein may be used for reduction of a substance, such as $CO_2$, from a first gas. The first gas may comprise air with a $CO_2$ concentration in the range of 100-5000 ppm or any other concentration.

In accordance with some embodiments, the sorbent construct 100 may be regenerated by streaming a second or additional gas through the sorbent, wherein the second gas, prior to reduction of the substance, comprises air with a $CO_2$ concentration of substantially less than 800 ppm below the $CO_2$ concentration in the first gas.

In accordance with some embodiments, the sorbent construct 100 may be used for reduction of $CO_2$ from a gas, comprising a solid support formed of a plurality of particles, wherein the particles are formed with a diameter in a range of substantially 0.1-10 millimeters. The support may be impregnated by an amine-based compound comprising at least a 25% of secondary amines and being operable to capture the $CO_2$ for reduction thereof from the gas, which comprises a $CO_2$ concentration in the range of 100-2000 ppm.

Further features and advantages of the disclosed embodiments, as well as structure and operation of various embodiments of the current subject matter, are disclosed in detail below with references to the accompanying drawings.

Example embodiments of the methods and components of the current subject matter have been described herein. As noted elsewhere, these example embodiments have been described for illustrative purposes only, and are not limiting.

Other embodiments are possible and are covered by the current subject matter. Such embodiments will be apparent to persons skilled in the relevant art(s) based on the teachings contained herein. Thus, the breadth and scope of the current subject matter should not be limited by any of the above-described exemplary embodiments, but should be defined only in accordance with the following claims and their equivalents.

What is claimed is:

1. A sorbent for reduction of $CO_2$ from air of an enclosed space, comprising:
    a support comprising a plurality of solid particles having an average diameter dimension in the range of 0.1-10 millimeters; and
    an amine-based compound, wherein at least 25% of amine functional groups are secondary amines, being supported by the support,
    wherein the amine-based compound comprises a polyamine having between 25%-75% of secondary amines,
    wherein the support is impregnated with a solution of the amine-based compound, wherein the solution of the amine-based compound comprises water; and
    wherein the amine-based compound is configured to capture at least some of the $CO_2$ within the indoor air of the enclosed space and release at least a portion of the captured $CO_2$ by streaming outdoor air through the sorbent.

2. A sorbent according to claim 1, wherein the support comprises clay.

3. A sorbent according to claim 1, wherein the support is selected from the group consisting of:
    gels, molecular sieves, nanotube-containing materials, porous materials, sponge and sponge-like materials, electro-magnetically charged objects, porous organic polymers, ion exchange resins, polymeric absorbent resins, acrylic ester polymers, polystyrene divinyl benzene, polymethyl methacrylate (PMMA), polystyrene, styrene divinylbenzene (SDB), fly ash, activated carbon, carbon nanotubes, alumina nanoparticles, synthetic zeolite, porous alumina, porous minerals, porous silica, silica nanoparticle, fumed silica, activated charcoal, aluminum phyllosilicates, bentonite, montmorillonite, ball clay, fuller's earth, kaolinite, attapulgite, hectorite, palygorskite, saponite, sepiolitemetal, organic frameworks, and one or more combinations thereof.

4. A sorbent according to claim 1, wherein the support comprises a plurality of particles with an average diameter dimension in the range of 0.2-3 millimeters.

5. A sorbent according to claim 1, wherein the support comprises a plurality of particles with an average diameter dimension in the range of 0.3-1 millimeters.

6. A sorbent according to claim 1, wherein the support is selected from the group consisting of: granules, beads, pellets, extrudates and one or more combinations thereof.

7. A sorbent according to claim 1, comprising the amine-based compound wherein at least 50% of amine functional groups are secondary amines.

8. A sorbent according to claim 1, wherein the amine-based compound further comprises monoethanolamine (MEA), ethanolamine, methylamine, branched polyethyleneimine (PEI), linear polyethyleneimine (PEI), diethanolamine (DEA), dimethylamine, diethylamine, diisopropanolamine (DIPA) tetraethylenepentamine (TEPA), methyldiethanolamine (MDEA), methylethanolamine, or a combination thereof.

9. A sorbent according to claim 1, wherein the support is formed with a large total surface area.

10. A sorbent according to claim 1, wherein the indoor air comprises a $CO_2$ concentration of about 400 to about 5000 ppm.

11. A sorbent according to claim 1, wherein a $CO_2$ concentration in the outdoor air, prior to being streamed into the sorbent, is approximately about 300 to about 500 ppm.

12. A sorbent according to claim 1, wherein the outdoor air has a $CO_2$ concentration which is lower than the $CO_2$ concentration in the indoor air by substantially less than about 1600 ppm.

13. A sorbent according to claim 1, wherein the support comprises particles, fine particles or a powder based solid, and wherein the fine particles are agglomerated into larger particles so as to facilitate air flow through the sorbent.

14. A sorbent according to claim 1, wherein outdoor air is streamed through the sorbent at a temperature lower than about 100° C.

15. A sorbent according to claim 1, wherein outdoor air is streamed through the sorbent at a temperature lower than about 80° C.

16. A sorbent according to claim 1, wherein outdoor air is streamed through the sorbent at a temperature lower than about 60° C.

17. A sorbent according to claim 1, wherein outdoor air is streamed through the sorbent at a temperature lower than about 50° C.

18. A sorbent according to claim 1, wherein the sorbent is disposed in an HVAC system for removal of $CO_2$ from the indoor air within the HVAC system.

19. A sorbent for reduction of $CO_2$ from air of an enclosed space, comprising:
 a support comprising a porous solid fiber-based material intertwined to form a fabric or paper-like material; and
 an amine-based compound, wherein at least 25% of amine functional groups are secondary amines, being supported by the support,
 wherein the amine-based compound comprises a polyamine having between 25%-75% of secondary amines,
 wherein the sorbent is impregnated with a solution of the amine-based compound, wherein the solution of the amine-based compound comprises water; and
 wherein the amine-based compound is configured to capture at least some of the $CO_2$ within the indoor air of the enclosed space and release at least a portion of the captured $CO_2$ by streaming outdoor air through the sorbent.

20. A sorbent according to claim 19, wherein the support comprises a plurality of sheets.

21. A sorbent according to claim 20 wherein the support comprises a plurality of sheets with a thickness in the range of one micron to two centimeters.

22. A sorbent according to claim 19 wherein the support comprises a plurality of sheets with a thickness in the range of 2 to 80 millimeters.

23. A sorbent according to claim 1, wherein the amine-based compound further comprises a mixture of diethanolamine (DEA) and any other amine or compound.

24. A sorbent of claim 1, wherein the support is impregnated by the amine-based compound with additional mechanical stimulation, with catalysts, or with external energy sources, such as heat.

25. A sorbent for reduction of CO2 from air of an enclosed space, comprising:
 a support comprising a plurality of solid particles having an average diameter dimension in the range of 0.1-10 millimeters; and
 an amine-based compound comprising a polyamine having between 25%-75% of secondary amines and a solvent, wherein the solvent is water, and
 wherein the amine-based compound is configured to capture at least some of the CO2 within the indoor air of the enclosed space and release at least a portion of the captured CO2 by streaming outdoor air through the sorbent.

26. A sorbent for reduction of CO2 from air of an enclosed space, comprising:
 a support comprising a plurality of solid particles having an average diameter dimension in the range of 0.1-10 millimeters; and
 an amine-based compound comprising a polyamine having between 25%-75% of secondary amines and a solvent, wherein the solvent is water,
 wherein the support impregnated with the amine-based compound is not further dried, and
 wherein the amine-based compound is configured to capture at least some of the CO2 within the indoor air of the enclosed space and release at least a portion of the captured CO2 by streaming outdoor air through the sorbent.

* * * * *